United States Patent [19]
Wagoner et al.

[11] Patent Number: 5,966,493
[45] Date of Patent: Oct. 12, 1999

[54] FIBER OPTIC ATTENUATORS AND ATTENUATION SYSTEMS

[75] Inventors: Gregory A. Wagoner, Watervliet; Kevin J. McCallion, Albany; Gary O. Jameson, Saratoga Springs, all of N.Y.

[73] Assignee: Molecular OptoElectronics Corporation, Watervliet, N.Y.

[21] Appl. No.: 09/026,755

[22] Filed: Feb. 20, 1998

[51] Int. Cl.$^6$ .................................................. G02B 6/00
[52] U.S. Cl. ............................... 385/140; 385/28; 385/30
[58] Field of Search .............................. 385/140, 27, 28, 385/30, 37, 39, 141; 372/102, 20, 99

[56] References Cited

U.S. PATENT DOCUMENTS 5,781,675  7/1998  Tseng et al. .............................. 385/30

OTHER PUBLICATIONS

Pan, R.P., Liou, S.R., & Lin, C.K., "Voltage–Controlled Optical Fiber Coupler Using a Layer of Low–Refractive–Index Liquid Crystal with Positive Dielectric Anisotropy," Jpn. J. Phys., vol. 34, Part 1, No. 12A, (Dec. 1995), pp. 6410–6415.

Digonnet, M.J.F., et al., "Measurement of the Core Proximity in Polished Fiber Substrates and Couplers," Optics Letter, vol. 10, No. 9, (Sep. 1985), pp. 463–465.

Ottokar, G. & Zengerle, R., "Determination of Single–Mode Fiber Coupler Design Parameters from Loss Measurements," IEEE Journal of Lightwave Technology, vol. LT–3, No. 4, (1985), pp. 864–867.

Cordaro, H., et al., "Precision Fabrication of D–Shaped Single–Mode Optical Fibers by In Situ Monitoring," IEEE Journal of Lightwave Techology, vol. 12, No. 9, (1994), pp. 1524–1531.

*Primary Examiner*—Phan Palmer
*Attorney, Agent, or Firm*—Heslin & Rothenberg, P.C.

[57] ABSTRACT

Controllable fiber optic attenuators and attenuation systems are disclosed for controllably extracting optical energy from a fiber optic, and therefore attenuating the optical signal being transmitted through the fiber optic. In one aspect, material is removed from a portion of the fiber optic, thereby exposing a surface through which optical energy can be extracted. A controllable material is formed over the surface for controllably extracting optical energy according to a changeable stimulus applied thereto, which affects the refractive index thereof. In an improved embodiment, a controllable material is formed over the exposed surface for controlling the amount of optical energy extracted from the fiber optic, and a bulk material is formed over the controllable material, into which the extracted optical energy is radiated. The controllable material has a controllable index of refraction approximately matching the index of refraction of the cladding of the fiber optic, and the bulk material formed over the controllable material has a fixed index of refraction higher than the effective mode index of refraction of the fiber optic. This cladding-driven design varies the effective optical thickness of the controllable material, and therefore effects a controllable attenuation of the optical signal being transmitted in the fiber optic. Attenuation systems including these controllable attenuators, as well as control and sense sub-systems, are also disclosed.

28 Claims, 8 Drawing Sheets

FIBER OPTIC ATTENUATORS AND ATTENUATION SYSTEMS

TECHNICAL FIELD

The present invention relates to controllable attenuators and attenuation systems for attenuating optical energy transmitted through a fiber optic.

BACKGROUND OF THE INVENTION

There is often a requirement in fiber optic systems for precise control of optical signal levels entering various system components. This is particularly true for systems at test and characterization stages of deployment. A controllable optical attenuator can be used, for example, to characterize and optimize the optoelectronic response of high-speed photoreceivers, wherein the detection responsivity is dependent on the average optical power incident on the photodiode.

The majority of controllable fiber optic attenuators currently commercially available rely on thin-film absorption filters. This requires breaking the fiber and placing the filters in-line. Controllable attenuation is then achieved by mechanical means such as rotating or sliding the filter to change the optical path length within the absorptive material. This adversely impacts the response speed of the device, the overall mechanical stability, zero attenuation insertion loss and optical back reflection. In general, broken fiber designs suffer numerous disadvantages such as high insertion loss, significant back reflection, and large size. These factors can be minimized, although such corrective measures typically result in added cost and/or size.

What is required are improved controllable fiber optic attenuators and attenuation systems which keep the optical fiber core intact and which achieve controllable attenuation via control of radiative loss from the fiber.

SUMMARY OF THE INVENTION

The present invention relates to controllable fiber optic attenuators (e.g., variable optical attenuators "VOAs") and attenuation systems, designed to operate in the conventional telecommunication spectral windows of 1300 nm and 1550 nm, or any other wavelengths of interest, especially those at which single mode propagation occurs. The devices can be placed in fiber optic networks or systems by simple fusion splicing or connectorization to attenuate optical signal levels by a desired amount. Controllable attenuation is achieved, for example, by thermal or electrical control of controllable material layers. The devices can be used for controllable attenuation in fiber optic systems at the test and characterization stage, or for active control during operational deployment.

The side-polished fiber ("SPF") devices of the present invention are an improvement over conventional broken fiber approaches because of their intrinsic fiber continuity.

In a first embodiment of a controllable attenuator of the present invention, a fiber is mounted in a block and polished to within a close proximity (e.g., a few microns) of the core. A controllable bulk material, with an approximately matched refractive index (to the effective fiber mode index) is applied over the polished surface. Adjusting the index of refraction of the bulk material (e.g., via the electro- or thermo-optic effect), results in a controllable amount of optical energy extracted from the fiber optic, thus achieving controllable attenuation.

An attenuation system, including a controllable attenuator, is also disclosed in which a control circuit applies a changeable stimulus to the controllable material, in accordance with a desired level stimulus, and/or a sensed level stimulus received from a sense circuit coupled to the fiber optic for sensing a level of optical energy being transmitted therein.

In an improved embodiment of the controllable attenuator of the present invention, the fiber is polished through its cladding almost to its core, and a thin controllable material is placed between the fiber and a high-index, bulk overlay material. The index of refraction of the controllable material (approximately matched to that of the cladding) is varied, which effectively varies the effective optical thickness (index x actual thickness) of the remaining cladding. This improved, cladding-driven ("CD") controllable attenuator provides nearly spectrally flat optical attenuation in the wavelength ranges of interest, while retaining all of the intrinsic advantages of the SPF architecture. Moreover, a design is disclosed where the typically used radius block holding the fiber is eliminated, which allows the device to be reduced in size so that it is not much larger than the fiber itself.

In that regard, the present invention relates to, in its first embodiment, an attenuation system for attenuating optical energy being transmitted through a fiber optic. A controllable attenuator is arranged with respect to a portion of the fiber optic having material removed therefrom thereby exposing a surface thereof through which at least some of the optical energy can be controllably extracted. The attenuator includes a controllable material formed over the surface for controllably extracting the optical energy according to a changeable stimulus applied thereto which affects the refractive index thereof. A level sensing circuit may be coupled to the fiber optic for sensing a level of at least a portion of the optical energy transmitted therein and providing a sensed level stimulus to a control circuit, which is coupled to the controllable attenuator for applying the changeable stimulus to the controllable material thereof in accordance with the sensed level stimulus received from the level sensing circuit.

The changeable stimulus applied to the controllable material may be, for example, temperature (thermo-optic effect) or voltage (electro-optic effect).

In a second, improved aspect, the present invention relates to a cladding-driven ("CD") controllable attenuator for attenuating optical energy transmitted through a fiber optic. The controllable attenuator is arranged with respect to a portion of the fiber optic having material removed therefrom thereby exposing a surface thereof through which at least some of the optical energy being transmitted therein can be extracted. The controllable attenuator includes a controllable material formed over the exposed surface for controlling an amount of optical energy extracted from the fiber optic according to a changeable stimulus applied to the controllable material which affects the index of refraction thereof. In addition, a bulk material layer formed over the controllable material is provided into which the extracted optical energy is radiated.

In this embodiment, the controllable material has a controllable index of refraction approximately matching the index of the cladding, and the bulk material formed over the controllable material has a fixed index of refraction higher than the effective mode index of the fiber optic.

The controllable fiber optic attenuators and attenuation systems of the present invention are valuable in any applications where control of the optical power transmission in an optical fiber is required. The attenuators are especially useful in applications where the spectral flatness of attenuation is a concern. Because of the fiber continuity, these devices exhibit the intrinsic benefits of low insertion loss, low back reflection (high return loss), polarization insensitivity, small size, low cost, and mass produceability.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of the preferred embodiment(s) and the accompanying drawings in which:

FIG. 1b is an end cross-sectional view of the controllable attenuator of FIG. 1a;

DETAILED DESCRIPTION OF THE PREFERRED EMBODIMENT(S)

Figure 1A:
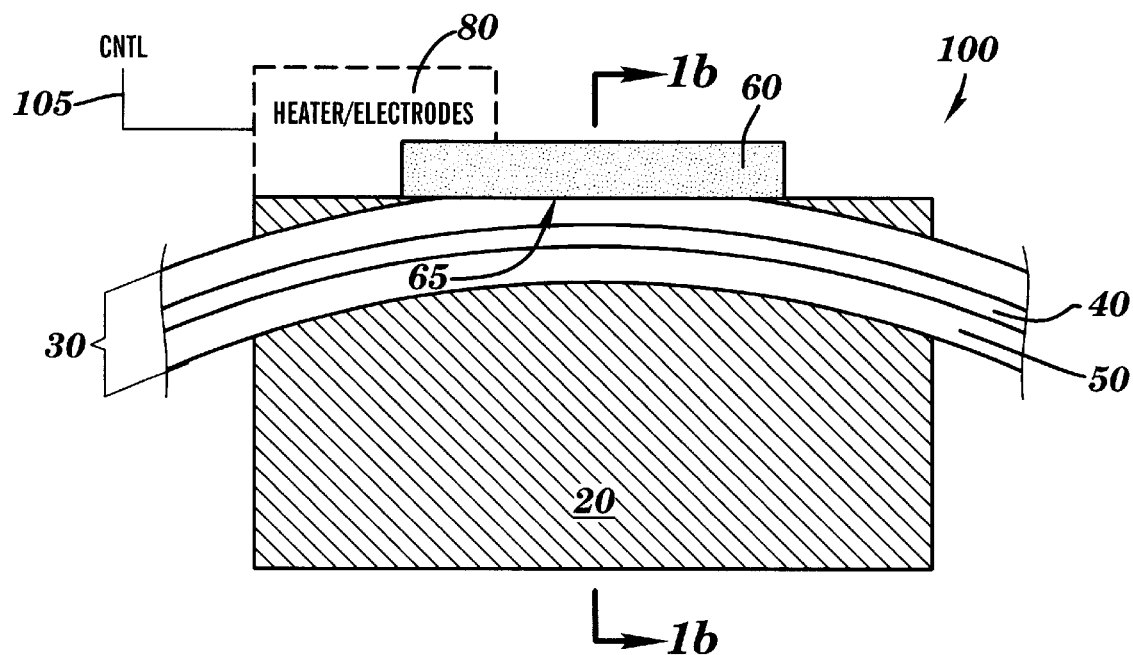
FIG. 1a is a side, cross-sectional view of a first embodiment of a controllable fiber optic attenuator in accordance with the present invention.
Figure 1B:
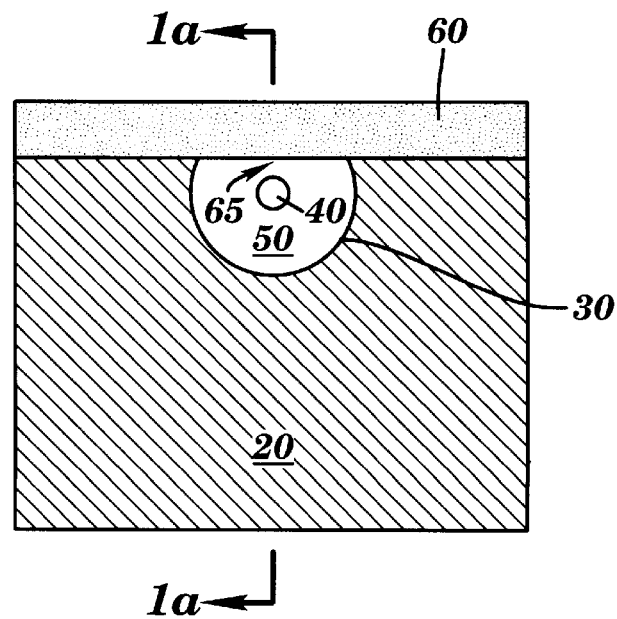

In accordance with the principles of the present invention, a first embodiment 100 of a controllable attenuator is depicted in FIGS. 1a–b, in which a single-mode optical fiber 30 (e.g., telecommunications Corning SMF-28) is side-polished through its cladding 50 close to its core 40, thereby exposing, through surface 65, an evanescent tail of the optical energy transmitted in the fiber. Typically, the remaining cladding thickness is <about 10 $\mu$m. Optical energy can be extracted from the fiber core by application of a bulk material 60 over the polished surface 65 of the fiber cladding. The bulk material should have a refractive index slightly less than or approximately equal to that of the fiber's effective mode index $n_{ef}$. This value is dependent upon the fiber core and cladding indices, and the fiber core dimensions, but usually lies between the core and cladding indices. Maximum optical energy is extracted from the fiber when the index of the bulk material matches the fiber's effective mode index.

In accordance with the present invention, and as discussed in greater detail below, the bulk material may be formed from a material which is controllable, e.g., its index of refraction can be varied according to a changeable stimulus applied thereto. In the embodiment of FIG. 1a, temperature or voltage changes can be used, and a controllable heating element (or electrodes) 80 is provided, for providing a changeable temperature (or voltage) stimulus to material 60 in accordance with a control stimulus 105.

Discussed below are first, the fabrication of the side-polished fiber portion of attenuator 100 and its subsequent loss characterization; second, alternate embodiments 100' and 100'" of a controllable attenuator; and finally, the implementation of an attenuation system including the controllable attenuator 100 (or 100' or 100"), in addition to other control sub-systems.

Side-Polished Fiber Fabrication/Characterization

Standard single-mode fibers have an 8.3 $\mu$m diameter core region 40 of slightly raised refractive index surrounded by a 125±1 $\mu$m fused silica cladding 50. The mode field diameter is 9.3±0.5 $\mu$m at 1310 nm and 10.5±0.5 $\mu$m at 1550 nm. The refractive index values supplied by Corning for SMF-28 fiber are:

$\lambda$=1300 nm: $n_{core}$=1.4541, $n_{clad}$=1.4483

$\lambda$=1550 nm: $n_{core}$=1.4505, $n_{clad}$=1.4447

The small difference between the core and cladding refractive indices combined with the small core size results in single-mode propagation of optical energy with wavelengths above 1190 nm. Therefore, the fiber can be used in both spectral regions although it was designed for 1310 nm operation where dispersion (combination of material and waveguide dispersion) is minimized and attenuation is low (<0.4 dB/km).

The side-polished fiber controllable attenuator of FIGS. 1a–b may be fabricated by lapping and polishing techniques. The fiber is embedded in a fused silica substrate block 20 containing a controlled radius groove. Material is carefully removed from the fiber cladding 50 until the core 40 is approached. At this point, the evanescent field of the optical energy transmitted in the optical fiber can be accessed through surface 65. The device interaction length can be controlled by the remaining cladding thickness and the groove's radius of curvature.

Once the fiber core has been approached via the lapping/polishing process, a multiple liquid-drop procedure may be performed to characterize the loss of the side-polished fiber. This procedure involves placing a series of bulk overlays (e.g., liquids, oils) of known refractive index onto the polished surface of the fiber. This has the advantage that the interface between the oil and the side-polished fiber is always as good as the fiber surface and there is no need to treat the surface/oil interface in any special way.

Figure 2A:
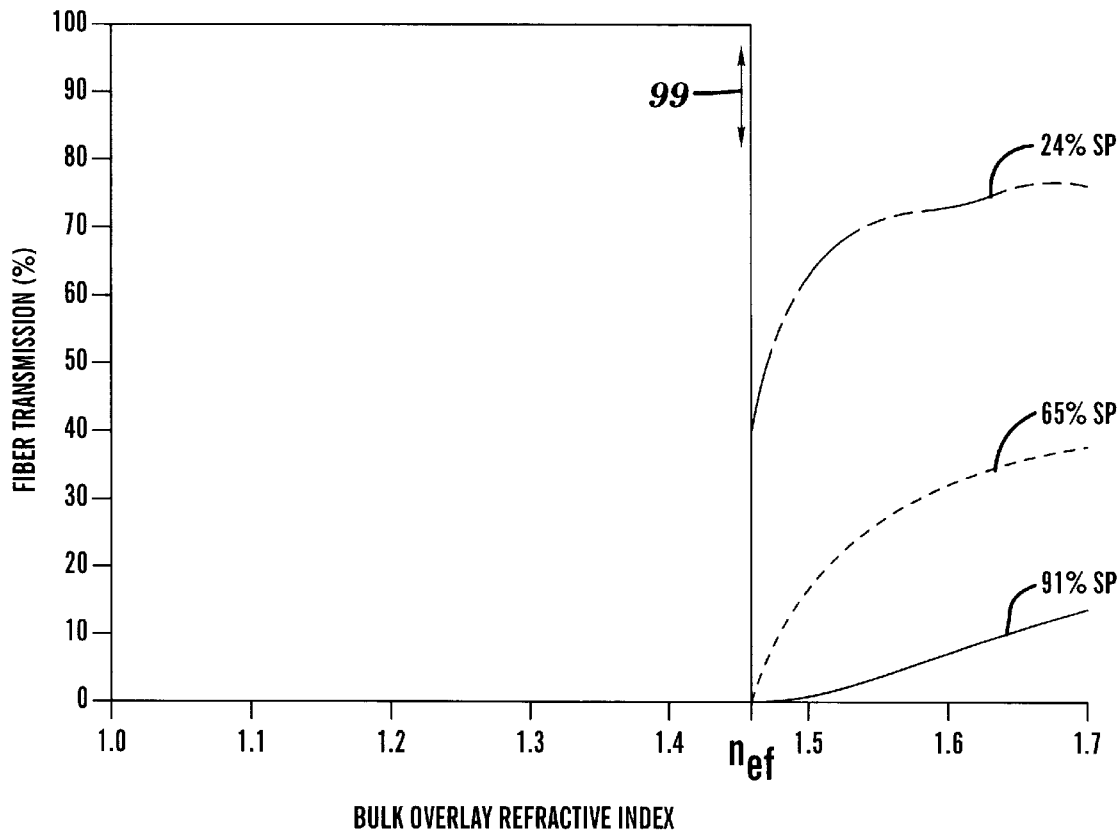
FIGS. 2a–b are graphs (in percentage, and decibels, respectively) depicting the loss characterization versus the refractive index of a bulk (e.g., liquid) overlay for three exemplary levels of fiber side-polishing.
Figure 2B:
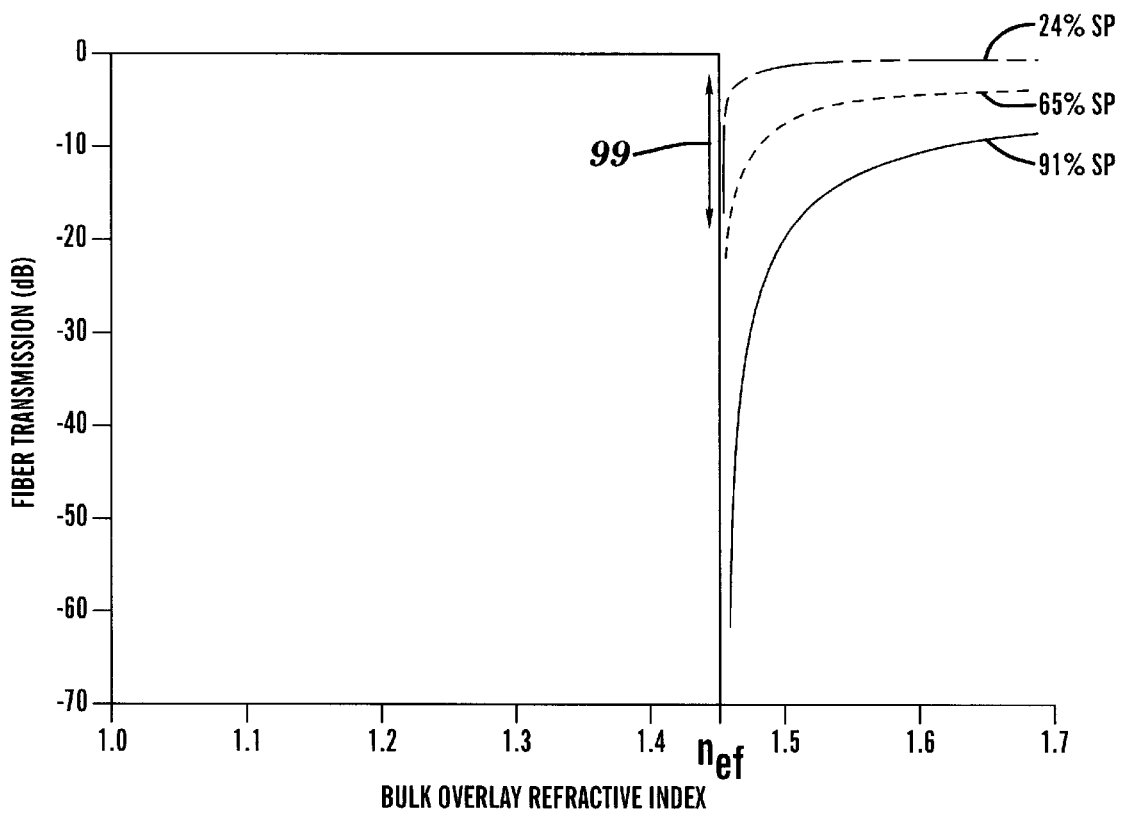

A set of Cargille Refractive Index Liquids is available with well-characterized refractive indices and dispersion curves. Thus, an accurate loss/refractive index characterization of each fabricated side-polished fiber can be obtained. Each liquid used in the measurements has a specified $n_D$ value, where subscript D denotes the Sodium D-Line wavelength ($\lambda$=589 nm). Dispersion equations are available which allow the response to be adjusted to the spectral region of interest i.e. 1300 nm or 1550 nm. FIGS. 2a–b show the optical energy transmission in percentage and decibels, respectively, versus the liquid's refractive index response for three side-polished fibers which each have different remaining cladding thicknesses (i.e., 24%, 65% and 91% polished cladding levels). At liquid indices below the fiber mode effective index ($n_{ef}$), no optical power is removed from the fiber. Close to $n_{ef}$, the transmission response drops sharply and strong extraction is observed. Above $n_{ef}$, the fiber transmission gradually approaches a set level of attenuation.

Prior to any cladding removal, the fiber guides light efficiently. When part of the cladding is removed, a new cladding exists which is composed of a small thickness of fused silica surrounded by air (n=1). Since this composite cladding has an effective cladding index less than that of the core, the fiber can still operate efficiently as a waveguide. This is true for those overlays having indices less than the fiber mode effective index, and 100% optical energy transmission therefore occurs. However, when the liquid index is raised above $n_{ef}$, the fiber operates as a leaky waveguide and a bulk wave is excited in the liquid. Thus, power is leaked from the fiber within the interaction region and a certain attenuation occurs. The efficiency of coupling to the bulk wave is maximum when the liquid's index matches the fiber mode effective index $n_{ef}$. This efficiency is reduced when the liquid's index is increased above $n_{ef}$, although a significant fraction of power is still coupled out of the fiber.

Transmission measurements can be made using Fabry-Perot Diode Lasers at 1300 nm and 1550 nm and a well-calibrated Optical Power Meter. Stronger attenuation figures are observed for the same liquid index at 1550 nm since the evanescent penetration of the fiber mode field into the cladding is greater at the longer wavelength.

In accordance with the present invention, as discussed above, a bulk material 60 is applied over the exposed surface of the side-polished fiber optic. The bulk material 60 is, for example, a controllable polymer (e.g., electro-optic or thermo-optic) with an index of refraction closely matched to the effective mode index of the fiber, and which exhibits a change in refractive index proportional to a change in, e.g., temperature or voltage. OPTI-CLAD® 145 available from Optical Polymer Research, Inc. is an example of such a polymer. A controllable attenuator (100, FIGS. 1a–b) is therefore formed capable of extracting a controllable amount of optical energy from the fiber. Control of the attenuation is provided by heating element (or electrodes) 80 controlled using a control stimulus 105.

To achieve the maximum thermo-optic responsivity, for example, the controllable attenuator is implemented to exploit the most sensitive characteristic refractive index response of the side-polished fiber, determined as set forth above. This occurs when the refractive index of the bulk material is slightly less than the effective mode index of the optical fiber (e.g., $n_{ef}$=1.449), i.e., proximate the vertical lines 99 drawn on the graphs of FIGS. 2a–b. These lines 99 therefore describe in general the theoretical operating range of this first embodiment of a side-polished fiber controllable attenuator.

Alternate Controllable Attenuator Embodiments

One aspect of the above-discussed controllable attenuator embodiment 100 is that the level of attenuation may vary with wavelength, which may cause design problems for multi-wavelength transmission systems.

In accordance with the present invention, an improved, cladding-driven ("CD") side-polished fiber controllable attenuator is disclosed which improves spectral performance while retaining all of the intrinsic performance strengths of non-invasive, side-polished fiber devices.

Figure 3B:
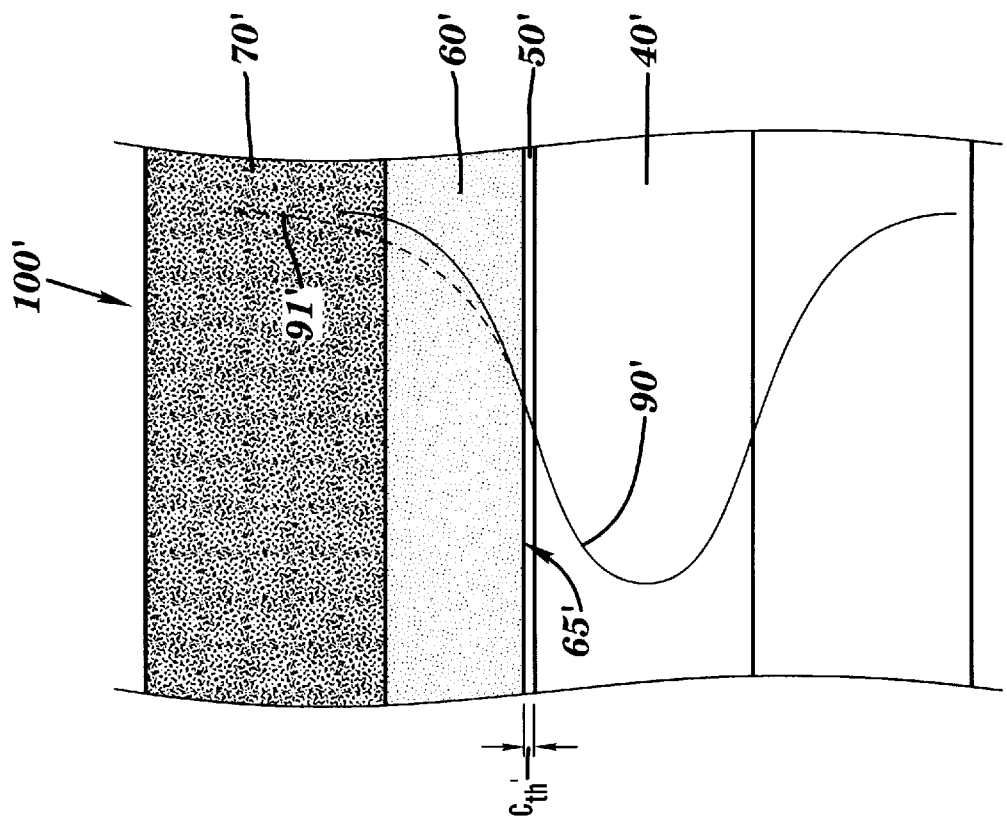
FIG. 3b is a detailed view of the material interfaces of a second, cladding-driven embodiment of a controllable fiber optic attenuator of the present invention.
Figure 3A:
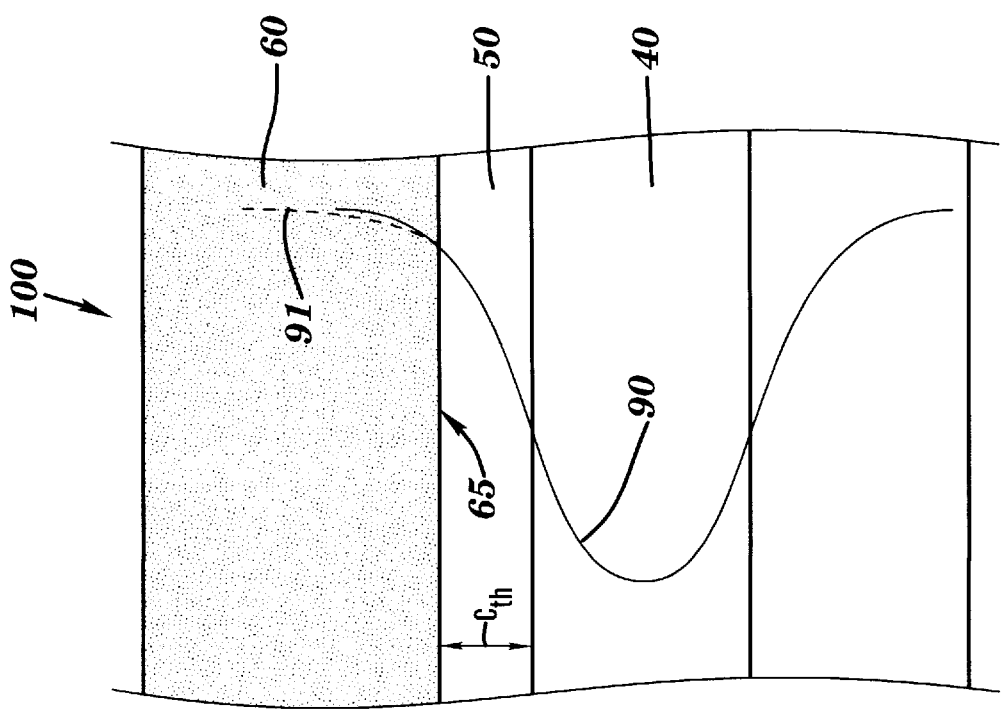
FIG. 3a is a detailed view of the material interfaces of the controllable attenuator of FIGS. 1a–b, and further depicts an exemplary mode profile of the optical energy being transmitted in the fiber optic.

FIGS. 3a–b respectively depict in detail the material interfaces of the bulk overlay controllable attenuator 100 discussed above, and the improved, cladding-driven controllable attenuator 100' of the present invention. With reference to FIG. 3a, controllable attenuator 100 includes a fiber core 40, a remaining portion of cladding 50 (thickness $C_{th}$, e.g., <about 10 µm) having an exposed surface 65 thereof through which optical energy is extracted into controllable bulk material 60. A mode profile 90 is also depicted approximating the amount of optical energy present in the material layers, including the evanescent tail 91 (the penetration of which into layer 60 is controllable as set forth above).

The cladding-driven controllable attenuator 100' of FIG. 3b also includes a fiber core 40', but remaining portion 50' of the cladding (thickness $C_{th}'$, e.g., <about 2 µm) is a very thin layer and a thin film(e.g., thickness <about 10 µm) of controllable material 60' is positioned over cladding 50'. A bulk material 70' is positioned over layer 60' and is a high index material. Evanescent tail 91' of mode profile 90' penetrates through exposed surface 65' into high index layer 70' at a depth determined by the effective optical thickness (index x actual thickness) of controllable material 60', which has an index approximately matched to that of the cladding. This effective optical thickness of layer 60' (index x actual thickness) is controlled by varying the refractive index thereof according to the techniques discussed above, e.g., thermo-optic or electro-optic effects.

The most significant differences between the cladding-driven embodiment 100' and the controllable bulk material embodiment 100 are: (i) most of the fiber cladding is initially removed (on the polished side) and replaced with a cladding index matched, but controllable thin layer of material 60' (e.g. a thermo-optic polymer having an index of about 1.447 at 1300 nm) and (ii) the bulk overlay 70' is of higher index, for example, silicon, with an index of about 3.5.

Figure 4A:
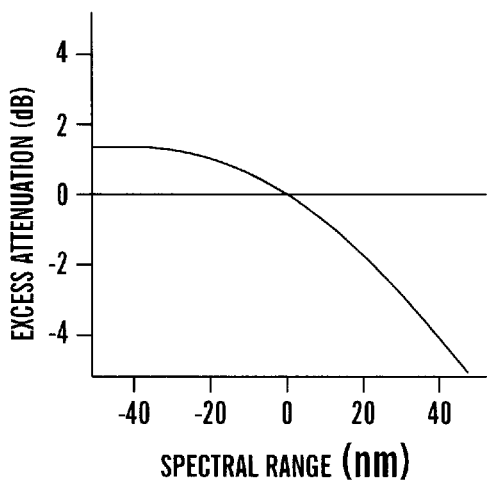
FIGS. 4a–b are respective graphs of the spectral performance of the controllable attenuators of FIGS. 3a–b.
Figure 4B:
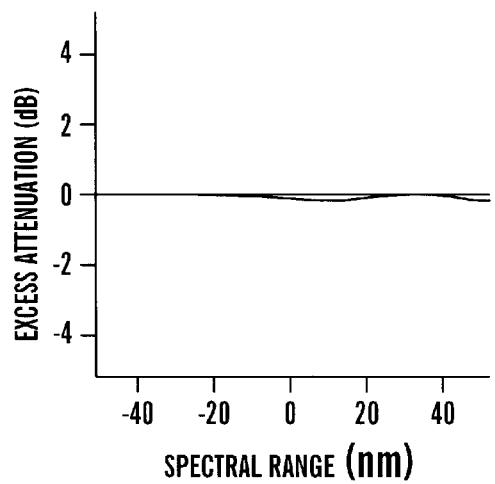

As shown in the graphs of FIGS. 4a–b, which respectively represent the spectral performance of controllable attenuator embodiments 100 and 100', these improvements result in a better spectral uniformity. The reasons for this spectral uniformity can be understood by referring to the respective operating ranges 99 and 99' of the attenuation graph of FIG. 5. The attenuation of a side-polished fiber device is a sensitive function of both: (i) the remaining cladding thickness; and (ii) the index of any overlay material. In the first embodiment of controllable attenuator 100, a significant portion of the evanescent tail of the fiber mode profile propagates within the remaining cladding. Therefore to achieve significant attenuation, the side-polished fiber is overlaid with a bulk material 60 which has a refractive index which lies close to the effective fiber mode index, $n_{ef}$. Adjusting the bulk material index produces an attenuation transfer function which follows the very sharp edge of the attenuation response curve, i.e., proximate vertical line 99.

However, because this edge is so sharp, the amount of attenuation is very sensitive to variations in the fiber mode profile. Therefore, effects such as dispersion (changes in refractive index versus wavelength), can result in wavelength dependent performance. Another, perhaps more significant effect occurs simply because the fiber mode itself is larger at long wavelengths. This results in increased evanescent penetration into the overlay, and thus higher attenuation.

The cladding-driven controllable attenuator embodiment 100' eliminates these effects because its operation is based on an entirely different transfer function. As shown toward the right side of FIG. 5, the cladding-driven approach adjusts the effective optical thickness of the remaining cladding using the controllable, cladding index-matched layer 60', and therefore changes the amount of evanescent tail 91' penetration into bulk material 70', which has a fixed, high index. The attenuation is therefore much less sensitive to variations in the refractive index of the bulk material when that index lies far above $n_{ef}$. The cladding-driven device therefore operates along vertical line 99' toward the right side of FIG. 5. This has been shown to produce attenuation levels which are nearly independent of wavelength (FIG. 4*b*), and therefore improves the spectral uniformity of the device.

The index insensitivity of the bulk material 70' also implies that for a given amount of remaining fiber cladding (which determines the amount of attenuation at high index for a given interaction length), varying the index of the bulk material 70' (e.g through the thermo-optic effect) will not significantly alter the amount of attenuation. Therefore the response of such a device without a controllable cladding layer would be negligible.

Figure 5:
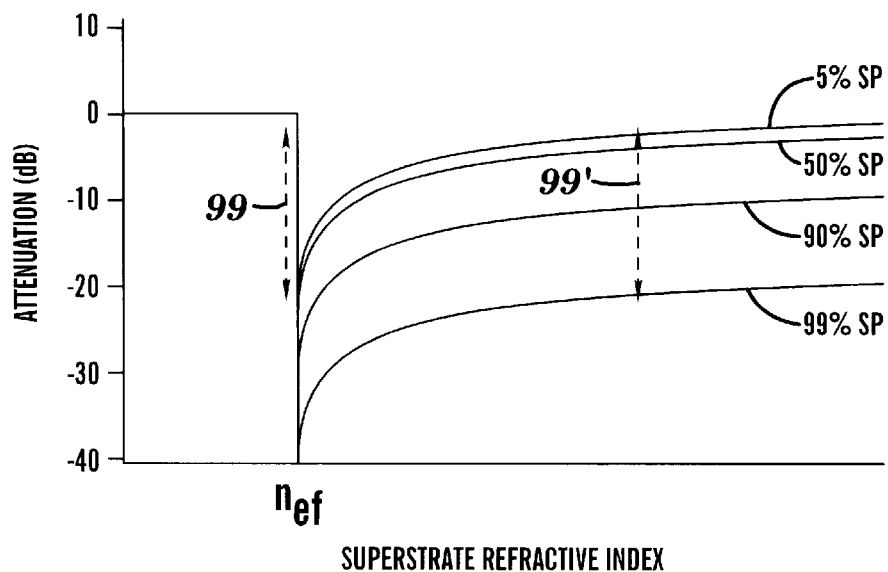
FIG. 5 is a graph of resultant attenuation versus the superstrate refractive index of side-polished fiber attenuators, and depicts the respective operating ranges of the controllable attenuators of FIGS. 3a–b.

The solution to this apparent impasse was found by observing that the amount of attenuation (with a high index bulk material) is very sensitive to the amount of remaining thickness of fiber cladding; i.e., the more cladding removed, the higher the resulting attenuation (as shown by the curves toward the right side of FIG. 5). Thus, if an SPF-based device is produced which operates along the transfer function 99' toward the right side of FIG. 5, then both high device responsivity and spectral flatness can be realized. The cladding-driven controllable attenuator 100' achieves these results.

In the cladding-driven controllable attenuator 100', nearly all of the original (silica) fiber cladding is removed (typically by polishing, although chemical etching is possible). This would normally result in a >99% (>–20 dB) high index overlay coupler. However, the removed cladding is replaced with a thin film of controllable material 60' (similar in thickness to the evanescent penetration depth) which has a similar (fiber cladding matched) ambient refractive index. Further, the refractive index of this material is much more responsive to an applied signal (e.g. thermo-optic: heat, or electro-optic: voltage), than that of the original silica cladding. On top of this thin layer, a high index bulk material 70' is applied to preserve spectral flatness, as discussed above.

Under ambient conditions, a device with very low attenuation results. However, by applying a changeable stimulus to the "replacement" cladding layer 60' which raises its index (up to that of the effective mode index), the evanescent mode penetration through this "replacement" cladding layer 60' can be varied, and therefore the depth of its penetration into the high index bulk overlay 70', effecting controllable attenuation. Removing the stimulus reduces the refractive index of the replacement cladding layer 60', which restores low loss transmission. Any induced variations in the refractive index of the bulk material 70' are negligible because of the intrinsic insensitivity of the device to this parameter. Thus, the cladding-driven controllable attenuator 100' simultaneously achieves high responsivity and spectral flatness, as well as low insertion loss, low back reflection, small size, and low loss characteristics of SPF-based devices, all of which make this embodiment highly attractive.

Figure 6A:
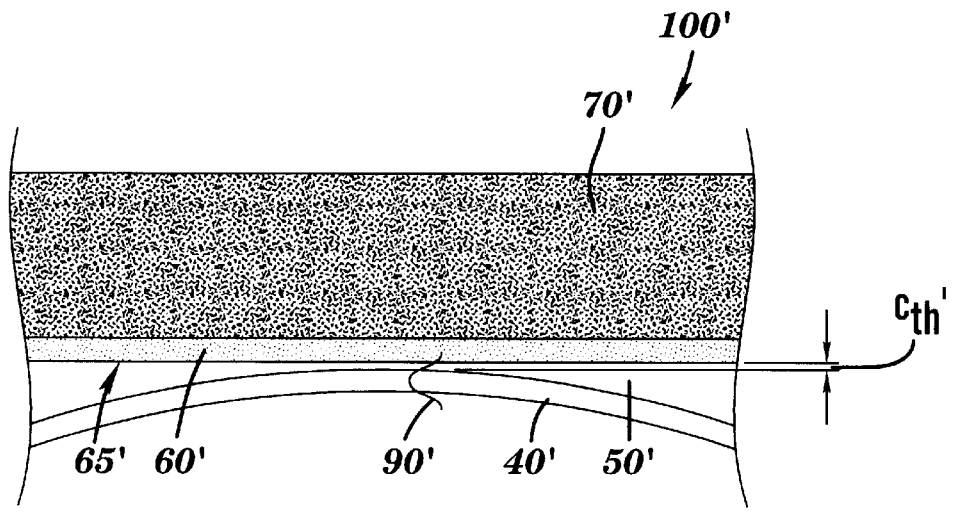
FIG. 6a is a side, cross-sectional view of the second, cladding-driven controllable attenuator of FIG. 3b.
Figure 6B:
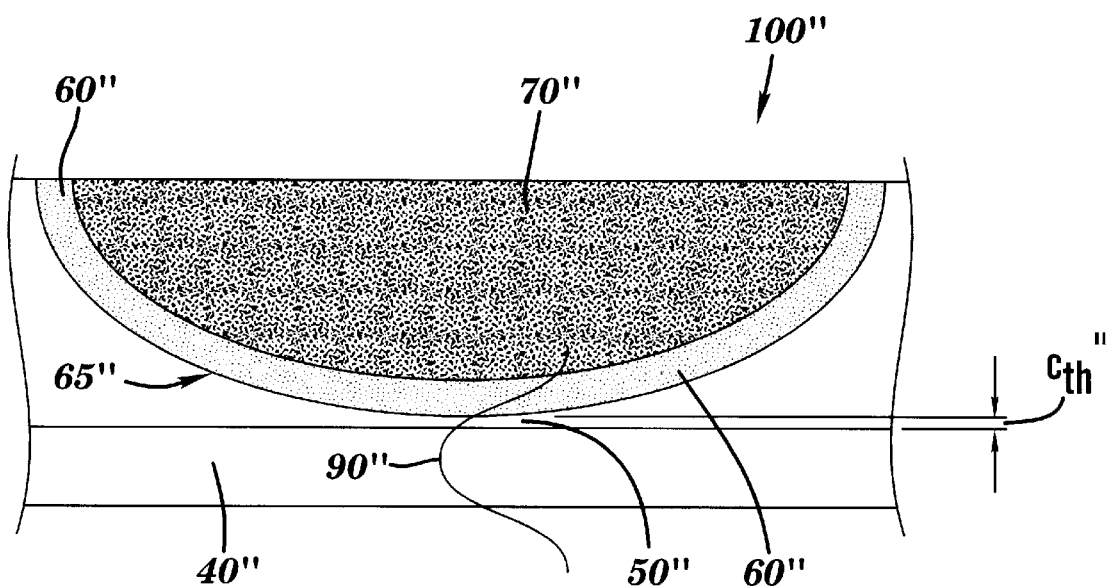
FIG. 6b is a side, cross-sectional view of an improvement to the cladding-driven controllable attenuator of the present invention wherein the cladding is removed from the fiber optic without a radial mounting in a substrate block.

Side, cross-sectional views of two potential embodiments (100' and 100") of cladding-driven controllable attenuators are shown in FIGS. 6*a*–*b*. The embodiment of FIG. 6*a*, discussed generally above, is a design based on the typical SPF radius groove block, wherein the radius of the fiber, upon its polishing, results in a flat surface 65' though which optical energy can be extracted. FIG. 6*b* depicts an alternative blockless design 100" which is fabricated by removing material to produce a radial surface 65", over which controllable material 60" and bulk material 70" are conformably formed, up to the outer diameter of the fiber. Cladding 50" remains (thickness $C_{th}$" of <about 2 μm). Elimination of the SPF block in the design 100" allows the device to be reduced in size, so that it is not much larger than the fiber itself.

Those skilled in the art will recognize that embodiment 100 discussed above can also be fabricated using this blockless design.

Attenuation System(s) Employing Controllable Attenuators

Figure 7:
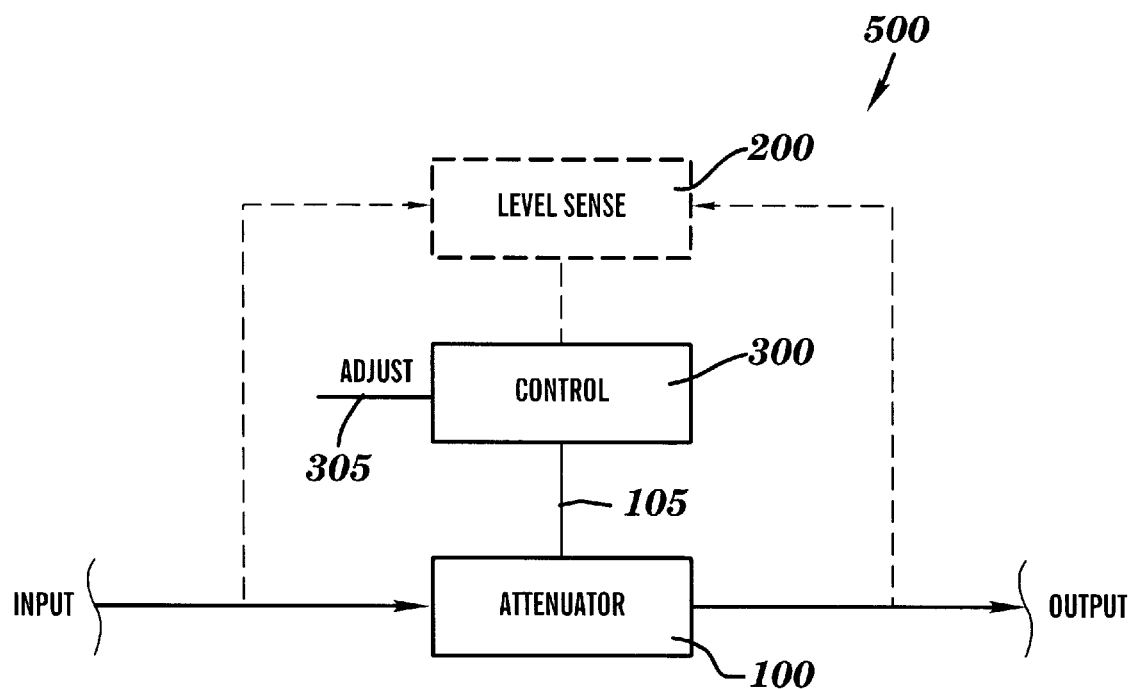
FIG. 7 is a functional block diagram of an exemplary attenuation system in accordance with the present invention.

An exemplary attenuation system 500 employing controllable attenuator 100 (or 100' or 100") is shown in FIG. 7. The attenuation system 500 includes a controllable attenuator 100 (or 100' or 100"), a control circuit 300, and an optional level-sense circuit 200. Control circuit 300 supplies control stimulus 105 to the controllable attenuator 100 to change the changeable stimulus (temperature or voltage) and therefore the refractive index of the controllable material thereof. Control circuit 300 receives as an optional input a desired level stimulus 305 from, for example, a user, and adjusts the control stimulus 105 as a function thereof. Control circuit 300 may also receive an optional sensed level stimulus from level sense circuit 200. This sensed level stimulus can be, for example, a ratio of measured levels of optical energy both prior to and following the attenuation thereof by the attenuator 100. By comparing this sensed level stimulus to the desired level stimulus, control circuit 300 can vary the value of control stimulus 105 until the input desired level stimulus and sensed level stimulus are matched.

Figure 8:
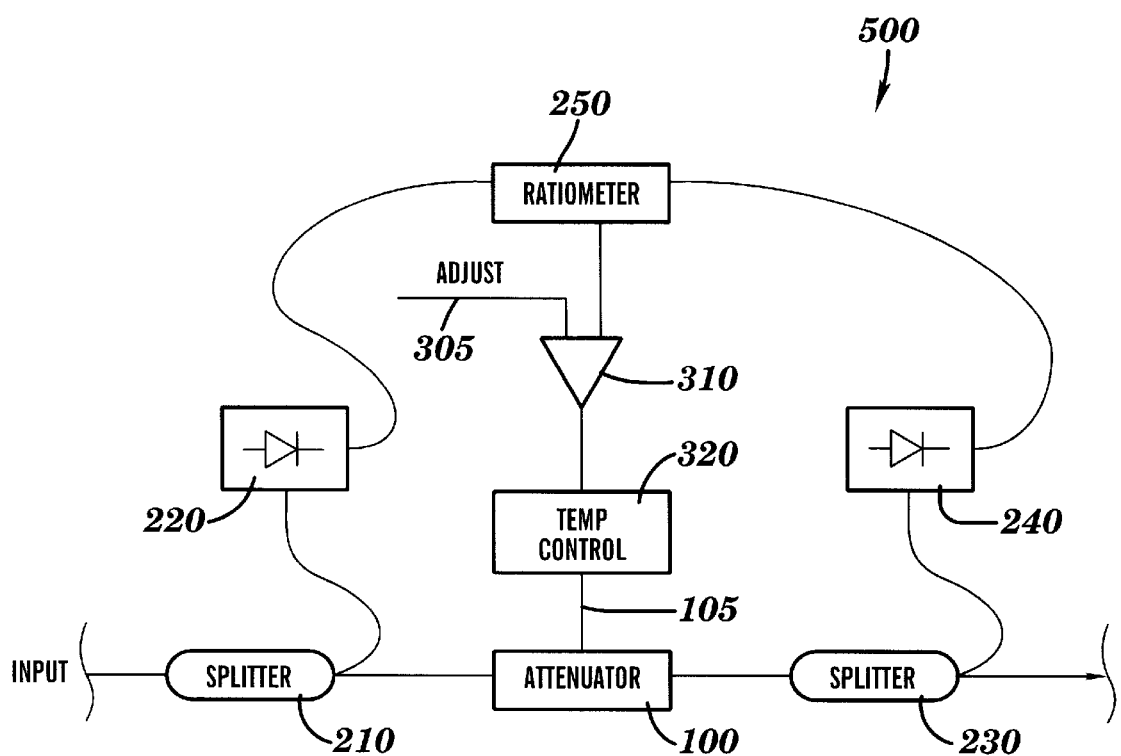
FIG. 8 is an exemplary schematic of the attenuation system of FIG. 7.

Exemplary attenuation system 500 is depicted in an exemplary schematic form in FIG. 8. The controllable attenuator 100 is preceded and followed by 1% fiber couplers (splitters 210, 230) which tap a small fraction of the optical power propagating in the fiber. The decoupled light is carried to characterized photodetectors (220, 240) and the generated photocurrents are analyzed by a ratiometer 250. Comparator circuit 310 receives the sensed level stimulus output of the ratiometer and/or a desired level stimulus 305 (from a user) and transmits a signal to the temperature controller 320. The temperature controller provides the control stimulus 105 to controllable attenuator 100 to change the changeable stimulus (temperature or voltage) and therefore the refractive index of the controllable material thereof. In this way, the optical attenuation level (photocurrent ratio) is directly compared to a calibrated attenuation adjustment signal 305 (user or system input) until they are matched. This feedback loop controls the attenuation effected by the controllable attenuator and therefore ensures accurate performance.

The present invention also extends to the methods for forming and using the disclosed controllable attenuators and attenuation systems, and further to methods for attenuation, discussed above.

Those skilled in the art will also recognize that the present invention extends to i.) fixed set point attenuators wherein, under controlled ambient conditions, the controllable material layers are designed with a predetermined refractive index such that a predetermined, fixed level of attenuation results, thereby negating the need for a changeable stimulus applied to the controllable material, and ii.) adaptive attenuation wherein a fixed attenuation level is desired, and the changeable stimulus is adaptively applied to the controllable material as a function of changing ambient conditions which unintentionally affect the refractive index of the controllable material.

While the invention has been particularly shown and described with reference to preferred embodiment(s) thereof, it will be understood by those skilled in the art that various changes in form and details may be made therein without departing from the spirit and scope of the invention.

What is claimed is:

1. A controllable attenuator for attenuating optical energy transmitted through a fiber optic, the controllable attenuator arranged with respect to a portion of the fiber optic, the portion of the fiber optic having material removed therefrom thereby exposing a surface thereof through which at least some of said optical energy transmitted therein can be extracted, the controllable attenuator including:

a controllable material formed over the exposed surface for controlling an amount of optical energy extracted from said fiber optic according to a changeable stimulus applied to the controllable material which affects the index of refraction thereof; and a bulk material, formed over the controllable material, into which the extracted optical energy is radiated.

2. An attenuation system, comprising:

the controllable attenuator of claim 1; and a control circuit coupled to the controllable attenuator for controlling a value of the changeable stimulus applied to the controllable material.

3. The attenuation system of claim 2, further comprising:

a level sensing circuit, coupled to said fiber optic, for sensing the level of at least a portion of the optical energy transmitted therein and providing a sensed level stimulus to said control circuit according to said sensed level;

wherein the control circuit controls the value of the changeable stimulus applied to the controllable material in accordance with the sensed level stimulus.

4. The controllable attenuator of claim 1, wherein the material removed from the fiber optic is a portion of cladding encasing a core thereof, and wherein:

the controllable material has a controllable index of refraction approximately matching the index of refraction of the cladding; and the bulk material formed over the controllable material has a fixed index of refraction higher than the effective mode index of refraction of the fiber optic.

5. The controllable attenuator of claim 1, wherein the changeable stimulus applied to the controllable material comprises temperature or voltage.

6. An attenuation system for attenuating optical energy transmitted through a fiber optic, comprising:

a controllable attenuator, arranged with respect to a portion of the fiber optic, the portion of the fiber optic having material removed therefrom thereby exposing a surface thereof through which at least some of said optical energy can be controllably extracted, the attenuator including a controllable material formed over said surface for controllably extracting said optical energy according to a changeable stimulus applied to said controllable material which affects the refractive index thereof;

a level sensing circuit, coupled to said fiber optic, for sensing a level of at least a portion of the optical energy transmitted therein and providing a sensed level stimulus; and a control circuit coupled to the controllable attenuator for controlling an amount of the changeable stimulus applied to the controllable material in accordance with the sensed level stimulus, received from the level sensing circuit.

7. The attenuation system of claim 6, wherein the level sensing circuit includes:

a first sensing circuit for sensing an amount of optical energy transmitted in said fiber optic prior to any extraction thereof by said controllable attenuator;

a second sensing circuit for sensing an amount of optical energy transmitted in said fiber optic following any extraction thereof by said controllable attenuator; and a circuit for determining a level of optical energy extracted from said fiber optic according to the sensed amounts of optical energy prior to and following the extraction thereof by said controllable attenuator, and providing the sensed level stimulus to the control circuit based on said level of optical energy extracted.

8. The attenuation system of claim 7, wherein the control circuit includes a comparing circuit for comparing the sensed level stimulus and the desired level stimulus applied thereto, and, based on any difference therebetween, changing the value of the control stimulus provided to the controllable attenuator.

9. The attenuation system of claim 8, wherein the changeable stimulus applied to the controllable material comprises temperature or voltage, and wherein the control circuit provides a control stimulus to said controllable attenuator to change the temperature or voltage applied to said controllable material.

10. The attenuation system of claim 9, wherein:

the controllable attenuator includes a bulk material formed over the controllable material into which the extracted optical energy is radiated.

11. The attenuation system of claim 10, wherein the material removed from the fiber optic is a portion of cladding encasing a core thereof, and wherein:

the controllable material of the controllable attenuator has a controllable index of refraction approximately matching the index of refraction of the cladding; and the bulk material formed over the controllable material has a fixed index of refraction higher than the effective mode index of refraction of the fiber optic.

12. The attenuation system of claim 9, wherein:

the controllable attenuator includes a controllable heating element, or electrodes, having an input for receiving said control stimulus from said control circuit, and arranged with respect to the controllable material to change the temperature, or voltage, and therefore the refractive index thereof in accordance with said control stimulus.

13. The attenuation system of claim 6, wherein the changeable stimulus to be applied to the controllable material comprises temperature or voltage, and wherein the control circuit provides a control stimulus to said controllable attenuator to change the temperature or voltage applied to said controllable material.

14. The attenuation system of claim 13, wherein:

the controllable attenuator includes a controllable heating element, or electrodes, having an input for receiving said control stimulus from said control circuit, and arranged with respect to the controllable material to change the temperature, or voltage, and therefore the refractive index thereof in accordance with said control stimulus.

15. A method for controllably attenuating optical energy transmitted through a core of a fiber optic, a portion of the fiber optic having a portion of cladding encasing the core removed therefrom, thereby exposing an evanescent tail of the optical mode field transmitted through the core, the method comprising:

extracting optical energy from the evanescent tail of the optical mode field using a bulk material, positioned over said portion of the fiber optic, into which the evanescent tail penetrates;

using a controllable material positioned between the bulk material and the core of the fiber optic to vary a depth of penetration of the evanescent tail into the bulk material, including varying the index of refraction of the controllable material; and sensing a level of at least a portion of the optical energy transmitted in said fiber optic;

wherein said using a controllable material includes varying the index of refraction of the controllable material according to the sensed level of at least a portion of the optical energy transmitted in said fiber optic.

16. A method for controllably attenuating optical energy transmitted through a core of a fiber optic, a portion of the fiber optic having a portion of cladding encasing the core removed therefrom, thereby exposing an evanescent tail of the optical mode field transmitted through the core, the method comprising:

extracting optical energy from the evanescent tail of the optical mode field using a bulk material, positioned over said portion of the fiber optic, into which the evanescent tail penetrates; and using a controllable material positioned between the bulk material and the core of the fiber optic to vary a depth of penetration of the evanescent tail into the bulk material including varying the index of refraction of the controllable material;

wherein a majority of the cladding between an outer radius thereof and the core is removed from the portion of the fiber optic, and wherein:

said using a controllable material includes varying an effective optical thickness thereof by varying the index of refraction thereof, thereby varying the depth of penetration of the evanescent tail into the bulk material.

17. A method for controllably attenuating optical energy transmitted through a core of a fiber optic, a portion of the fiber optic having a portion of cladding encasing the core removed therefrom, thereby exposing an evanescent tail of the optical mode field transmitted through the core, the method comprising:

extracting optical energy from the evanescent tail of the optical mode field using a bulk material, positioned over said portion of the fiber optic, into which the evanescent tail penetrates; and using a controllable material positioned between the bulk material and the core of the fiber optic to vary a depth of penetration of the evanescent tail into the bulk material, including varying the index of refraction of the controllable material;

wherein:

the controllable material has a controllable index of refraction approximately matched to the index of refraction of the cladding; and the bulk material has a fixed index of refraction higher than the effective mode index of refraction of the fiber optic.

18. A method for controllably attenuating optical energy transmitted through a core of a fiber optic, a portion of the fiber optic having a portion of cladding encasing the core removed therefrom, thereby exposing an evanescent tail of the optical mode field transmitted through the core, the method comprising:

extracting optical energy from the evanescent tail of the optical mode field using a bulk material, positioned over said portion of the fiber optic, into which the evanescent tail penetrates; and using a controllable material positioned between the bulk material and the core of the fiber optic to vary a depth of penetration of the evanescent tail into the bulk material, including varying the index of refraction of the controllable material;

wherein said using a controllable material includes:

varying the index of refraction of the controllable material by changing a temperature or voltage stimulus applied thereto.

19. A method for forming a controllable attenuator for attenuating optical energy transmitted through a fiber optic, comprising:

removing material from a portion of the fiber optic thereby exposing a surface thereof through which at least some of said optical energy transmitted therein can be extracted;

forming a controllable material over the surface for controlling an amount of optical energy extracted from the fiber optic in accordance with refractive index changes induced therein by a changeable stimulus to be applied thereto;

forming a bulk material over the controllable material into which the extracted optical energy is radiated.

20. A method for forming an attenuation system, comprising:

forming a controllable attenuator in accordance with the method of claim 19, and providing a control circuit coupled to the controllable attenuator for controlling a value of the changeable stimulus to be applied to the controllable attenuator.

21. The method of claim 20, further comprising:

providing a level sensing circuit coupled to the fiber optic for sensing the level of at least a portion of the optical energy transmitted therein and providing a sensed level stimulus to said control circuit according to said sensed level;

wherein the control circuit is formed to control the value of the changeable stimulus to be applied to the controllable material in accordance with the sensed level stimulus.

22. The method of claim 19, wherein the material removed from the fiber optic is a portion of cladding encasing a core thereof, and wherein:

the controllable material is formed to have a controllable index of refraction approximately matching the index of refraction of the cladding; and the bulk material formed over the controllable material is formed to have a fixed index of refraction higher than the effective mode index of refraction of the fiber optic.

23. The method of claim 19, wherein the changeable stimulus to be applied to the controllable material comprises temperature or voltage.

24. A method for forming an attenuation system for attenuating optical energy transmitted through a fiber optic, comprising:

removing material from a portion of the fiber optic thereby exposing a surface thereof through which at least some of said optical energy transmitted therein can be extracted;

forming a controllable material over the surface for controlling an amount of optical energy extracted from the fiber optic in accordance with refractive index changes induced therein by a changeable stimulus to be applied thereto;

providing a level sensing circuit, coupled to said fiber optic, for sensing a level of at least a portion of the optical energy transmitted therein and providing a sensed level stimulus; and providing a control circuit for controlling a value of the changeable stimulus to be applied to the controllable material in accordance with the sensed level stimulus, received from the level sensing circuit.

25. The method of claim 24, wherein the changeable stimulus to be applied to the controllable material comprises temperature or voltage, and wherein the control circuit is formed to provide a control stimulus to the controllable material to change the temperature or voltage thereof.

26. The method of claim 25, further comprising:

providing a controllable heating element, or electrodes, having an input for receiving the control stimulus from said control circuit, and arranged with respect to the controllable material to change the temperature, or voltage, and therefore the refractive index thereof in accordance with said control stimulus.

27. The method of claim 24, further comprising:

forming a bulk material over the controllable material into which the extracted optical energy is radiated.

28. The method of claim 27, wherein the material removed from the fiber optic is a portion of cladding encasing a core thereof, and wherein:

the controllable material is formed to have a controllable index of refraction approximately matching the index of refraction of the cladding; and the bulk material formed over the controllable material is formed to have a fixed index of refraction higher than the effective mode index of refraction of the fiber optic.

* * * * *